(12) United States Patent
de Zeeuw et al.

(10) Patent No.: US 11,873,408 B2
(45) Date of Patent: Jan. 16, 2024

(54) CHROMIUM- AND PHOSPHATE-FREE COATING FOR ELECTRICALLY INSULATING AN ELECTRIC STRIP

(71) Applicant: Henkel AG & Co. KGaA, Duesseldorf (DE)

(72) Inventors: Ard de Zeeuw, Duesseldorf (DE); Todd Bryden, Duesseldorf (DE); Andreas Arnold, Hilden (DE); Ramona Oliva, Hilden (DE); Volker Geick, Grevenbroich (DE)

(*) Notice: Subject to any disclaimer, the term of this patent is extended or adjusted under 35 U.S.C. 154(b) by 252 days.

(21) Appl. No.: 16/893,738

(22) Filed: Jun. 5, 2020

(65) Prior Publication Data
US 2020/0299518 A1  Sep. 24, 2020

Related U.S. Application Data

(63) Continuation of application No. PCT/EP2018/083908, filed on Dec. 7, 2018.

(30) Foreign Application Priority Data

Dec. 7, 2017  (EP) ...................................... 17205916

(51) Int. Cl.
C09D 1/02 (2006.01)
H01F 1/18 (2006.01)

(52) U.S. Cl.
CPC .................. C09D 1/02 (2013.01); H01F 1/18 (2013.01)

(58) Field of Classification Search
CPC ... C09D 1/02; C09D 7/61; C09D 5/08; C08K 2003/2237; C08K 2003/2241; C08K 2003/2227; H01F 1/18
See application file for complete search history.

(56) References Cited

U.S. PATENT DOCUMENTS

| | | | |
|---|---|---|---|
| 1,924,311 A | 8/1933 | Frey | |
| 3,839,256 A | 10/1974 | Parkinson | |
| 4,238,534 A * | 12/1980 | Ichida | ..................... C23C 22/74 148/261 |
| 4,762,753 A * | 8/1988 | Perfetti | ............... H01F 1/14783 148/273 |
| 2004/0126483 A1 | 7/2004 | Heimann et al. | |

FOREIGN PATENT DOCUMENTS

| | | | | |
|---|---|---|---|---|
| CN | 103892726 A | 4/2014 | | |
| CN | 105131585 A | 12/2015 | | |
| CN | 106574137 A | 4/2017 | | |
| CN | 106922155 A | 7/2017 | | |
| DE | 2146344 A1 | 3/1972 | | |
| DE | 2247269 A1 | 4/1973 | | |
| DE | 2460543 A1 | 7/1976 | | |
| EP | 1752548 A1 | 2/2007 | | |
| EP | 1967612 A1 | 9/2008 | | |
| EP | 2752503 A1 | 7/2014 | | |
| GB | 1362184 A * | 7/1974 | ............... | D07B 7/14 |
| GB | 1362184 A | 7/1974 | | |
| GB | 1497188 A * | 1/1978 | ............... | C09D 1/02 |
| JP | 2001247944 A | 9/2001 | | |

OTHER PUBLICATIONS

International Search Report for PCT/EP2018/083908, dated Mar. 4, 2019.
European Search Report for EP 17205916 dated Mar. 26, 2018.
Van Acker, K., et al, "Abrasive wear by TiO2 particles on hard and on low friction coatings", Wear 256 (2004) 353-361, Flemish Institute for Technological Research (Vito), Boeretang 200, Mol B-2400, Belgium, Copyright 2003 Elsevier B. V.

* cited by examiner

*Primary Examiner* — Humera N. Sheikh
*Assistant Examiner* — Kevin C T Li
(74) *Attorney, Agent, or Firm* — Mary K. Cameron

(57) ABSTRACT

The present invention relates to a method for providing electrically insulating and anti-corrosive coatings on electrical steel strip by using a phosphate-free aqueous dispersion. Furthermore, the invention relates to such an aqueous dispersion which is particularly suitable for providing electrically insulating and anti-corrosive coatings on electrical steel strip. The aqueous dispersion of the present invention is substantially free of phosphates and organic compounds and comprises silicates dissolved in water as an inorganic binder which forms the coating, and a mixture of oxide pigments of the elements titanium and aluminum. The subject matter of the invention also comprises a laminated electrical steel strip which is made from the electrical steel strip produced in the method according to the invention or from electrical steel strip coated with an aqueous dispersion according to the invention.

20 Claims, No Drawings

CHROMIUM- AND PHOSPHATE-FREE COATING FOR ELECTRICALLY INSULATING AN ELECTRIC STRIP

The present invention relates to a method for providing electrically insulating and anti-corrosive coatings on electrical steel strip by using a phosphate-free aqueous dispersion. Furthermore, the invention relates to such an aqueous dispersion which is particularly suitable for providing electrically insulating and anti-corrosive coatings on electrical steel strip. The aqueous dispersion of the present invention is substantially free of phosphates and organic compounds and comprises silicates dissolved in water as an inorganic binder which forms the coating, and a mixture of oxide pigments of the elements titanium and aluminum. The subject matter of the invention also comprises a laminated electrical steel strip which is made from the electrical steel strip produced in the method according to the invention or from electrical steel strip coated with an aqueous dispersion according to the invention.

With an annual worldwide production of around 10 million tons, electrical steel sheet is the most important soft magnetic material in terms of quantity and value. It is sub-divided according to its properties into non-grain-oriented and grain-oriented materials. In the narrower sense, electrical steel sheet and electrical steel strip refer to a cold-rolled strip made of iron-silicon alloys, as well as the laminations cut or punched therefrom, which are used to produce magnetic circuits for electric machines, i.e. iron cores for dynamos, electric motors, transformers, relays, contactors, choke coils, ignition coils, electric meters and controllable deflection magnets. Grain-oriented electrical steel strip is an important material in the production of energy-efficient transformers. Grain-oriented electrical steel strip can be found as the core material in distribution and power transformers in layered, wound or punched form. Non-grain-oriented electrical steel strip, on the other hand, is used wherever anisotropic soft magnetic properties and a particularly low core loss are not required. Non-grain-oriented steel strip is mainly used in generators, electric motors, contactors, relays and small transformers.

The production of grain-oriented electrical steel strip is described in many ways in the prior art, for example in European patent application EP 1 752 548 A1. Typically, the final annealed cold-rolled strip is typically provided with corrosion protection prior to storage and transportation to the customer. A large number of pretreatment methods are known in the prior art which provide suitable coatings for transport protection.

Coating compositions for electrically insulating grain-oriented electrical steel strip are known in the prior art and usually contain chromium and optionally additional inorganic or organic binders which can be selected from phosphates, silicates and/or resins. Chromium-containing compositions are described in the laid-open application DE 2247269, and are also suitable for pretreatment to improve coating adhesion before an organic coating is applied to electrical steel strip for producing punched laminated iron cores, as is apparent from the laid-open application DE 2146344. Compositions formulated entirely without chromium for environmental hygiene reasons are also available and described, for example, in EP 1967612 A1, where they are presented as a composition based on copolymers of polysiloxanes having organic resins which, as coatings on electrical steel strip, impart both corrosion resistance and high electrical resistance.

More recently, purely inorganic compositions for applying electrically insulating and anti-corrosive coatings to electrical steel strip have also been described which do not use chromium compounds or water-soluble phosphates. For example, EP 2752503 A1 describes completely chromium- and phosphate-free water-based preparations composed of a mixture of silanes which contains at least one silane having at least one non-hydrolyzable functional group, and preferably particulate silica. Such compositions have the advantage of being largely unproblematic from an environmental hygiene point of view since they contain neither chromium compounds nor phosphates or organic solvents or components which are emitted into the environment during application or during baking.

There is therefore still a need for inexpensive, alternative chromium- and phosphate-free coating compositions which, in particular, do not use organic binders and can therefore be formulated completely without solvents. It is also relevant that these compositions, as coatings on electrical steel strip, have high electrical conductivity, good coatability and, in particular, good weldability for producing laminated iron cores.

The inventors of the present invention have now surprisingly found that the demanding requirement profile is met by aqueous dispersions which contain particular silicates dissolved in water in the presence of a water-insoluble oxide pigment.

In a first aspect, the invention therefore relates to a method for coating electrical steel strip, wherein a wet film of a water-based chromium- and phosphate-free composition is applied at least to part of the surface of the electrical steel strip and then dried, which composition contains
  A. at least 15 wt. %, but preferably no more than 40 wt. %, of silicates dissolved in water, calculated as $SiO_2$;
  B. at least 4 wt. %, but preferably no more than 15 wt. %, of sodium and/or potassium ions dissolved in water, calculated as Na; and
  C. at least 1 wt. %, but preferably no more than 10 wt. %, of at least one water-insoluble oxide pigment.

According to the present invention, the term "electrical steel strip" encompasses those types of steel in strip form which, due to their alloyed components of silicon and/or aluminum and their specific production method, have a coercive field strength of less than 1000 A/m and are therefore considered to be soft magnetic. In a preferred embodiment of the method according to the invention, the electrical steel strip is made of steel of which the proportion of silicon is in the range of from 0.2-4.5 wt. %, the proportion of carbon being less than 0.05 wt. %. The electrical steel strip treated in the context of the present invention is particularly preferably non-grain-oriented within the meaning of the DIN EN 10106: 2016-03 standard.

In the context of the present invention, a composition is "water-based" if the components of the composition are dissolved or dispersed in the aqueous phase and the water content is at least 40 wt. %.

In the context of the present invention, a composition is "phosphate-free" if it contains less than 1 g/kg, preferably less than 0.1 g/kg, particularly preferably less than 0.01 g/kg, of phosphates, calculated as $PO_4$.

In the context of the present invention, a composition is "chromium-free" if it contains less than 1 g/kg, preferably less than 0.1 g/kg, particularly preferably less than 0.01 g/kg, of chromium compounds, calculated as Cr.

In particular, water glasses and water glass solutions can be used as the source for the silicates according to component A) which are dissolved in water and are contained in the aqueous chromium- and phosphate-free composition of the method according to the invention, i.e. glass-like, i.e. amorphous, water-soluble silicates or the aqueous solutions thereof which are solidified from a melt. In a preferred embodiment of the method according to the invention, the aqueous chromium- and phosphate-free composition is therefore obtainable by mixing one or more water glass solutions each containing a silicate of the general empirical formula $M_2O \cdot nSiO_2$, where n is a natural number of at least 2.5, preferably at least 3.0, particularly preferably at least 3.5, but no greater than 4.5, preferably no greater than 4.0, and M is selected from sodium or potassium, with a corresponding amount of the at least one oxide pigment. This ensures optimal crosslinking of the inorganic binder matrix and optimal embedding of the oxide particles, which results in homogeneous coatings which have low electrical surface conductivity but are nevertheless easy to weld. Amounts of lithium water glasses can also be contained without having a negative effect on the binder matrix, but their presence is not preferred from an economical point of view, and, in a preferred embodiment, the proportion of lithium in the aqueous chromium- and phosphate-free composition is less than 1 wt. %, particularly preferably less than 0.1 wt. %, and very particularly preferably less than 0.01 wt. %.

For this, it is also advantageous if the oxide pigments have a D90 value of no more than 500 nm, preferably no more than 300 nm, particularly preferably no more than 200 nm. The D90 value indicates that 90 vol. % of the dispersed oxide pigments as a 1 wt. % aqueous dispersion in an ammoniacal buffer solution (pH=10) have a particle size below the stated value. The D90 value is determined from volume-weighted cumulative particle size distributions, wherein the particle size distribution curve can be measured using static light scattering methods.

According to the present invention, the term "oxide pigment" encompasses all pigments which, in addition to the metal or semi-metal elements, consist substantially of oxygen, wherein the restriction "substantially" allows for the pigment to be composed of up to 10 at. %, but preferably less than 5 at. %, of other non-metal elements.

The oxide pigment contained in the aqueous chromium- and phosphate-free composition in the method according to the invention is "water-insoluble", i.e. less than one gram of the pigment per kilogram of deionized water ($k<1$ $\mu Scm^{-1}$) can be dissolved at a temperature of 60° C. The oxide pigment is preferably water-insoluble and alkali-resistant, i.e. its solubility in an ammoniacal buffer solution (pH=10) at a temperature of 60° C. is less than one gram of the pigment per kilogram of the buffer solution.

In the method according to the invention, preferred oxide pigments are those of the elements Mg, Ca, Al, Si, Mn, Zn, Ti and/or Zr, particularly preferably oxide pigments of the elements Al, Ti and/or Zr, very particularly preferably of the elements Al and/or Ti, which are selected, for example, from the pigments which consist of at least 90 wt. % of $Al_2O_3$ and/or $TiO_2$. In particular, mixtures of oxide pigments of the elements Ti and Al give the coating produced in the method according to the invention a very good weldability at a sufficiently high electrical resistance. In this context, it is therefore preferred if the chromium- and phosphate-free composition in the method according to the invention contains, as component B), oxide pigments of the element Ti and the element Al and preferably the proportion of the elements Ti and Al, based on the total amount of the metal and half elements of the oxide pigments, is at least 50 at. %, particularly preferably at least 80 at. %, very particularly preferably at least 90 at. %, the amount ratio by mass Ti:Al preferably being in the range of from 70:30 to 30:70, particularly preferably in the range of from 60:40 to 40:60.

For good weldability of the coatings resulting from the aqueous chromium- and phosphate-free composition in the method according to the invention, it is preferred if the composition contains, as component B), either only sodium or potassium ions or sodium and potassium ions, the amount ratio by mass Na:K being either greater than 10:1 or less than 1:10. Such compositions are preferably obtained by mixing a plurality of water glass solution, wherein water glass solutions containing a silicate of the general empirical formula $Na_2O \cdot nSiO_2$ and water glass solutions containing a silicate of the general empirical formula $K_2O \cdot nSiO_2$ are used, where n is a natural number of at least 2.5, preferably at least 3.0, particularly preferably at least 3.5, but no greater than 4.5, particularly preferably no greater than 4.0.

The chromium- and phosphate-free compositions used in the method according to the invention can be formulated without solvents and also do not require the addition of organic resins in order to increase performance with regard to weldability and low electrical surface conductivity or to increase coatability. Only the addition of organosilanes can be advantageous in order to improve the latter property such that it can be preferred that the aqueous chromium- and phosphate-free composition in the method according to the invention additionally contains at least one organosilane having at least one hydrolyzable and at least one non-hydrolyzable substituent.

During condensation and/or hydrolysis, the hydrolyzable substituent of the organosilane cleaves off an alcohol that preferably has a boiling point of 100° C. at an atmospheric pressure of 1 bar. In preferred embodiments, the hydrolyzable substituents of the organosilanes of the compositions according to the invention are therefore selected from methoxy, ethoxy and/or propoxy groups, in particular from methoxy groups.

The non-hydrolyzable substituent has a covalent Si—C bond on the silicon atom. Suitable organosilanes can have either one or more alkyl groups, one or more glycidyloxy alkyl groups or one or more, preferably primary, amino group(s). Particularly suitable representatives of the organosilanes are selected from aminosilanes having the general structural formula (I):

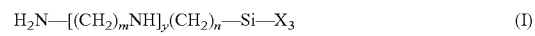
$$H_2N-[(CH_2)_mNH]_y(CH_2)_n-Si-X_3 \qquad (I)$$

where the substituents X are each selected, independently of one another, from alkoxy groups having no more than four, preferably no more than two, carbon atoms, where m and n are each, independently of one another, integers in the range of from 1-4 and y is an integer in the range of from 0-8, preferably in the range of from 1-5, for example 3-(diethylenetriamine)propyltrimethoxysilane, 3-(ethylenediamine)propyltrimethoxysilane, 3-amino-propyltrimethoxysilane, 3-(diethylenetriamine)propyltriethoxysilane, 3-(ethylenediamine)propyl-triethoxysilane and 3-aminopropyltriethoxysilane, particularly preferably 3-(diethylenetriamine) propyl-trimethoxysilane.

Nevertheless, it remains preferred if, in the method according to the invention, such aqueous chromium- and phosphate-free compositions are used where possible that do not release any volatile organic compounds during crosslinking and setting of the coating. In a preferred embodiment of the method according to the invention, the proportion of organic compounds having a boiling point of less than 150° C. at 1 atm in the aqueous chromium- and phosphate-free composition is below 4 wt. %, preferably below 1 wt. %, particularly preferably below 0.5 wt. % and very particularly preferably below 0.1 wt. %.

In this context, a method according to the invention is also preferred in which the TOC ("Total Organic Content") proportion in the aqueous chromium- and phosphate-free composition, calculated as $CO_2$, is less than 50 g/kg, preferably less than 10 g/kg, particularly preferably less than 1 g/kg, wherein the TOC proportion can be determined after combustion at 900° C. in the presence of a copper oxide catalyst in the nitrogen stream and downstream NIR analysis. The preferably low TOC content demonstrates that the aqueous chromium- and phosphate-free composition, without the addition of organic binders, ensures adequate coatability and passivation of the electrical steel strip to be coated in the method according to the invention.

The pH of the aqueous chromium- and phosphate-free composition is preferably alkaline, particularly preferably greater than 8.5, but preferably less than 11, particularly preferably less than 10.5. The pH in the context of the present invention corresponds to the negative decimal logarithm of the hydronium ion activity determined directly in the composition at 20° C. with a pH-sensitive glass electrode.

The aqueous chromium- and phosphate-free composition is applied in the method according to the invention as a wet film and then preferably dried by supplying heat. For this, the electrical steel strip is brought into contact with the composition. Bringing the composition into contact with the surface of the electrical steel strip can be done by all the known methods and includes, but is not limited to, spraying, dipping, rolling or roll-application and printing. The wet film preferably has a layer thickness of from 0.5 to 10 μm. In particular, the wet film is applied in such an amount that, after drying, a dry film layer thickness of at least 0.5 μm, preferably of at least 1 μm, but preferably no more than 5 μm is achieved. The wet film is preferably dried by heating the electrical steel strip in such a way that a peak metal temperature of at least 200° C., particularly preferably of at least 250° C., but preferably of no more than 500° C., particularly preferably of no more than 400° C., is reached. The peak metal temperature is preferably maintained for a period of 1 to 200, preferably 10 to 60, seconds. The low baking temperatures and the possibility of being able to formulate the aqueous chromium- and phosphate-free composition without organic binder components provides the methodological advantage that the required peak metal temperature can be reached quickly at high furnace temperatures and thus high heating rates without fear of longer furnace downtimes during short-term process stoppages in the continuous operation of a coating system, and without fear of the coating quality deteriorating due to the degradation of any organic binder components when the peak metal temperature is ultimately increased.

For producing iron cores, for example for rotors, stators or generators, steel sheets are punched out of the coated electrical steel strip as described above, pressed together in stacks and welded. Accordingly, the present invention also comprises laminated electrical steel strip comprising a large number of electrical steel strip portions which are arranged one above the other, are welded to one another at least on one side, preferably on both sides, and are provided with a coating consisting of silicate and oxide pigments of the elements Ti and Al, wherein the coating on the electrical steel strip portions is preferably obtainable by means of the methods according to the invention described above which use an aqueous chromium- and phosphate-free composition comprising, as component B), oxide pigments of the element Ti and the element Al.

In a further aspect, the invention relates to an aqueous dispersion which is particularly suitable for being applied to electrical steel strip so as to form electrically insulating coatings which nevertheless have outstanding weldability. Such an aqueous dispersion according to the invention contains:

A. at least 15 wt. %, but no more than 40 wt. %, of silicates dissolved in water, calculated as $SiO_2$;
B. at least 4 wt. %, but no more than 15 wt. %, of sodium and/or potassium ions dissolved in water, calculated as Na;
C. in total at least 1 wt. %, but in total no more than 10 wt. %, of water-insoluble oxide pigments of the element Ti and the element Al;
D. less than 10 mg/kg of phosphates, calculated as $PO_4$;
E. a TOC content of less than 10 g/kg, calculated as the amount of $CO_2$;

preferably obtainable by mixing one or more water glass solutions, each containing a silicate of the general empirical formula $M_2O \cdot nSiO_2$, where n is a natural number of at least 2.5, but no greater than 4.5, and M is selected from sodium or potassium, with a corresponding amount of the water-insoluble oxide pigments.

Further preferred embodiments of the aqueous dispersion can be found in the aqueous chromium- and phosphate-free composition described in the context of the first aspect of the present invention.

PRACTICAL EXAMPLES

Table 1 lists the formulations which were used to provide an insulating coating on non-grain-oriented steel sheets (M700-50A) and which were measured with regard to weldability and electrical volume resistance.

The compositions were prepared by dispersing the respective pigments into the liquid base formulation consisting of sodium and/or potassium water glass and applied to the steel sheets using a roller in a wet film thickness of 1.4 μm and then dried out in the furnace at 350° C. until they reached a peak metal temperature of 250° C.

It has been shown that only pigment-containing water glass formulations according to the invention have a sufficiently high volume resistance; surprisingly, the weldability is still provided (see E1-E5 in comparison with CE1-CE3). Furthermore, those formulations in which an amount of the pigment titanium oxide is contained are advantageous for the weldability (see E3 in comparison with E4 and E5). In addition, the formulations which are composed only of one water glass had the higher volume resistance as coatings on the steel sheets and were therefore superior to mixtures of water glasses (see E1 and E2 in comparison with E5).

TABLE 1

Formulations and their properties as a thin coating on non-grain-oriented steel (M700-50 A)

| | Water glass/ wt. % | | Oxide pigment/ wt. % | | Weldability * | | Resistance #/ |
|---|---|---|---|---|---|---|---|
| | Na [1] | K [2] | Al [3] | Ti [4] | A | B | □ cm² |
| E1 | 94 | — | 2.5 | 3.5 | 12 | 15 | ++++ |
| E2 | — | 94 | 2.5 | 3.5 | 0 | 3 | ++++ |
| E3 | 47 | 47 | 6 | — | 46 | 54 | +++ |

TABLE 1-continued

Formulations and their properties as a thin coating on non-grain-oriented steel (M700-50 A)

| | Water glass/ wt. % | | Oxide pigment/ wt. % | | Weldability * | | Resistance #/ |
|---|---|---|---|---|---|---|---|
| | Na [1] | K [2] | Al [3] | Ti [4] | A | B | □ cm² |
| E4 | 47 | 47 | — | 6 | 8 | 19 | +++ |
| E5 | 47 | 47 | 2.5 | 3.5 | 21 | 17 | +++ |
| CE1 | 100 | — | — | — | 20 | 35 | ++ |
| CE2 | — | 100 | — | — | 21 | 33 | ++ |
| CE3 | 50 | 50 | — | — | 18 | 31 | ++ |

[1] Sodium water glass 37/40
[2] Potassium water glass 28/30
[3] Aluminum oxide powder having a BET surface area of approx. 100 m²/g
[4] Titanium oxide powder in rutile modification having an average particle size of approx. 0.5 μm
* Number of pores in the weld seam after tungsten inert gas welding determined according to test sheet SEP1210 of the Association of German Ironworkers
A: Current strength: 125 A, feed: 100 mm/min
B: Current strength: 135 A, feed: 125 mm/min
Volume resistance measured according to ASTM A717
+ ≤ 20 □ cm²
++ > 20 □ cm²
+++ > 50 □ cm²
++++ > 100 □ cm²

As those skilled in the art will appreciate, numerous modifications and variations of the present invention are possible in light of these teachings, and all such are contemplated hereby.

The invention claimed is:

1. A method for coating an electrical steel strip, comprising steps of:
    applying a wet film of an aqueous chromium- and phosphate-free composition to at least a part of a surface of the electrical steel strip, which composition comprises:
        A) at least 15 wt. % of silicates dissolved in water, calculated as $SiO_2$;
        B) at least 4 wt. % of sodium and/or potassium ions dissolved in water, wherein a total content of the ions dissolved in water is calculated respectively as Na and/or K; and
        C) at least 1 wt. % of at least one water-insoluble oxide pigment; and
    drying the wet film on the surface of the electrical steel strip.

2. The method according to claim 1, wherein the aqueous chromium- and phosphate-free composition contains, as component B), either:
    i) only sodium ions or only potassium ions; or
    ii) sodium and potassium ions, the amount ratio by mass Na:K being either greater than 10:1 or less than 1:10.

3. The method according to claim 2, wherein the aqueous chromium- and phosphate-free composition is obtainable by mixing:
    one or more water glass solutions each containing a silicate of the general empirical formula $M_2O \cdot nSiO_2$, wherein "n" is a positive number of at least 2.5, but no greater than 4.5, and "M" is selected from sodium or potassium; with
    the at least one water-insoluble oxide pigment C).

4. The method according to claim 1, wherein component C) is selected from the water-insoluble oxide pigments of the elements Mg, Al, Mn, Zn, Ti and/or Zr.

5. The method according to claim 4, wherein the aqueous chromium- and phosphate-free composition comprises:
    A) at least 15 wt. %, but no more than 40 wt. %, of silicates dissolved in water, calculated as $SiO_2$;
    B) at least 4 wt. %, but no more than 15 wt. %, of sodium and/or potassium ions dissolved in water, calculated as Na and/or K, respectively; and
    C) at least 1 wt. %, but no more than 10 wt. %, of the at least one water-insoluble oxide pigment; and
component C) is selected from the water-insoluble oxide pigments of the elements Al, Ti and/or Zr.

6. The method according to claim 5, wherein component C) is selected from the water-insoluble oxide pigments of the element Ti and the element Al, present in an amount ratio by mass Ti:Al in a range of from 70:30 to 30:70.

7. The method according to claim 1, wherein amounts of organic compounds having a boiling point of less than 150° C. at 1 atm in the aqueous chromium- and phosphate-free composition are below 4 wt. %.

8. The method according to claim 1, wherein amounts of organic compounds having a boiling point of less than 150° C. at 1 atm in the aqueous chromium- and phosphate-free composition are below 0.1 wt. %.

9. The method according to claim 1, wherein Total Organic Content (TOC) includes all organic compounds containing C, and the TOC proportion in the aqueous chromium- and phosphate-free composition, calculated as $CO_2$, is less than 10 g/kg.

10. The method according to claim 1, wherein the wet film is dried by supplying heat such that a peak metal temperature of at least 200° C., but no more than 500° C., is maintained for a period of 1 to 200 seconds.

11. The method according to claim 10, wherein the wet film is dried by supplying heat such that the peak metal temperature of 250° C.-400° C. is reached.

12. The method according to claim 1, wherein such an amount of the wet film is applied that, after drying, a dry film layer thickness of at least 0.5 μm but no more than 5 μm is achieved.

13. The method according to claim 1, wherein the electrical steel strip is made of steel comprising silicon in a range of 0.2-4.5 wt. %, and less than 0.05 wt. % carbon.

14. The method according to claim 1, wherein the electrical steel strip is non-grain-oriented.

15. An aqueous dispersion, containing
    A) at least 15 wt. %, but no more than 40 wt. %, of silicates dissolved in water, calculated as $SiO_2$;
    B) at least 4 wt. %, but no more than 15 wt. %, of sodium and/or potassium ions dissolved in water, calculated as Na;
    C) in total at least 1 wt. %, but in total no more than 10 wt. %, of water-insoluble oxide pigments, comprising oxide pigments of the element Ti and the element Al;
    D) less than 10 mg/kg of phosphates, calculated as $PO_4$;
    E) a Total Organic Content of less than 10 g/kg, calculated as the amount of $CO_2$;
        obtainable by mixing one or more water glass solutions, each containing a silicate of the general empirical formula $M_2O \cdot nSiO_2$, where n is a natural number of at least 2.5, but no greater than 4.5, and M is selected from sodium or potassium, with a corresponding amount of the water-insoluble oxide pigments.

16. A laminated electrical steel strip, comprising a plurality of electrical steel strip portions which are arranged one above the other, are welded to one another, and are provided with a coating consisting of silicate and oxide pigments of the elements Ti and Al, coated according to the method of claim 5.

17. The method of claim 1, wherein the at least one water-insoluble oxide pigment C) comprises at least one water insoluble-oxide pigment of the element Ti having an average particle size of 0.5 μm.

18. The method of claim 12, wherein such an amount of the wet film is applied that, after drying, a dry film layer of at least 0.5 μm but no more than 2 μm is achieved.

19. The method of claim 1, wherein the applied wet film layer has a thickness between 0.5 μm and 1.4 μm.

20. A method for coating an electrical steel strip, comprising steps of:
- applying a wet film of an aqueous chromium- and phosphate-free composition to at least a part of a surface of the electrical steel strip, which composition comprises one or more water glass solutions, each containing a silicate of the general empirical formula $M_2O \cdot nSiO_2$, where n is a natural number of at least 2.5, but no greater than 4.5, and M is selected from sodium or potassium; the one or more water glass solutions comprising:
  - A) at least 15 wt. %, but no more than 40 wt. %, of silicates dissolved in water, calculated as $SiO_2$; and
  - B) at least 4 wt. %, but no more than 15 wt. %, of sodium and/or potassium ions dissolved in water, calculated as Na and/or K;
  - the wet film further comprising
  - C) in total at least 1 wt. %, but no more than 10 wt. %, of water-insoluble oxide pigments, different from A) and B), selected from water-insoluble oxide pigments of the elements Mg, Al, Mn, Zn, Ti and/or Zr; and optionally further comprising water-insoluble oxide pigments of Ca and Si; and
- drying the wet film on the surface of the electrical steel strip.

\* \* \* \* \*